Dec. 8, 1970 T. A. KORN ET AL 3,546,681

PROGRAMMED METHOD FOR MANIPULATING ELECTRONIC FONTS IN ELECTRONIC PHOTOCOMPOSITION SYSTEMS

Filed Jan. 30, 1969 2 Sheets-Sheet 1

INVENTORS
Traugott A. Korn and
Paul E. Justus

BY John T. O'Halloran
ATTORNEY

*INVENTORS*
*Traugott A. Korn and*
*Paul E. Justus*
BY *John T. O'Halloran*
ATTORNEY 3,546,681

PROGRAMMED METHOD FOR MANIPULATING ELECTRONIC FONTS IN ELECTRONIC PHOTOCOMPOSITION SYSTEMS

Traugott A. Korn, Princeton Junction, and Paul E. Justus, Englishtown, N.J., assignors to RCA Corporation, a corporation of Delaware Filed Jan. 30, 1969, Ser. No. 795,186
Int. Cl. G06f *3/14*
U.S. Cl. 340—172.5 7 Claims

ABSTRACT OF THE DISCLOSURE

A programming method is described which permits an electronic photocomposing unit to efficiently photocompose all the characters of a particular typographic font, even though the memory of the unit is insufficient to store all of the electronic signals necessary to create all of the characters of the particular font on an imaging device. The method includes a division of each font into a plurality of subsets of sizes that may be stored in the memory and the automatic monitoring of the memory to keep track of the subsets stored therein, so as to update the memory when a different subset is required.

BACKGROUND OF THE INVENTION

Recently, electronic photocomposition systems have become commercially available. One such system includes a photocomposing unit that utilizes an imaging device, such as a cathode ray tube, to create characters on the face thereof by a plurality of adjacent vertical scanlines that form slices of the characters. The cathode ray tube beam is turned on and off periodically by a bi-level video signal while the beam scans in successive line sweeps. Thus, alternate black and white segments of a slice of a character, and its background, are formed during each scanline. The characters so formed on the cathode ray tube are imaged onto photographic film and developed for subsequent processing into printing plates, such as offset printing plates.

A memory, or storage device, is incorporated into the photocomposing unit of the electronic photocomposition system to store the electronic signals that determine when the cathode ray tube beam should be blanked and unblanked to provide the character slices. The totality of these character determining signals with other parameters such as character width, etc., are termed an electronic font. Each different electronic font creates a different typographic font on the imaging device. The typographical font created on the photographic film is visually similar to the same font created by pure mechanical or optical techniques.

Certain fonts, and certain point sizes of other fonts, require such a large number of character determining signals to create characters of a high graphic quality that it is not practicable to provide a photocomposing unit memory capable of storing the entire font. Consequently, the problem arises as to how to create characters from the entire font in an efficient manner.

SUMMARY OF THE INVENTION

A programmed method of manipulating electronic fonts efficiently includes the steps of: dividing an electronic font into a plurality of subsets of character determining signals; selecting the subsets into which successive textual characters belong; preparing the selected subsets to be written into selected location of a utilization storage device; monitoring the selected subsets to keep track of their assigned locations; selecting an additional subset when needed; and preparing said additional subset to be overwritten onto a previously selected subset in said storage device to replace said previously selected subset when the monitoring indicates that no unused locations are available in said storage device for said additional subset.

DETAILED DESCRIPTION

Figure 1:
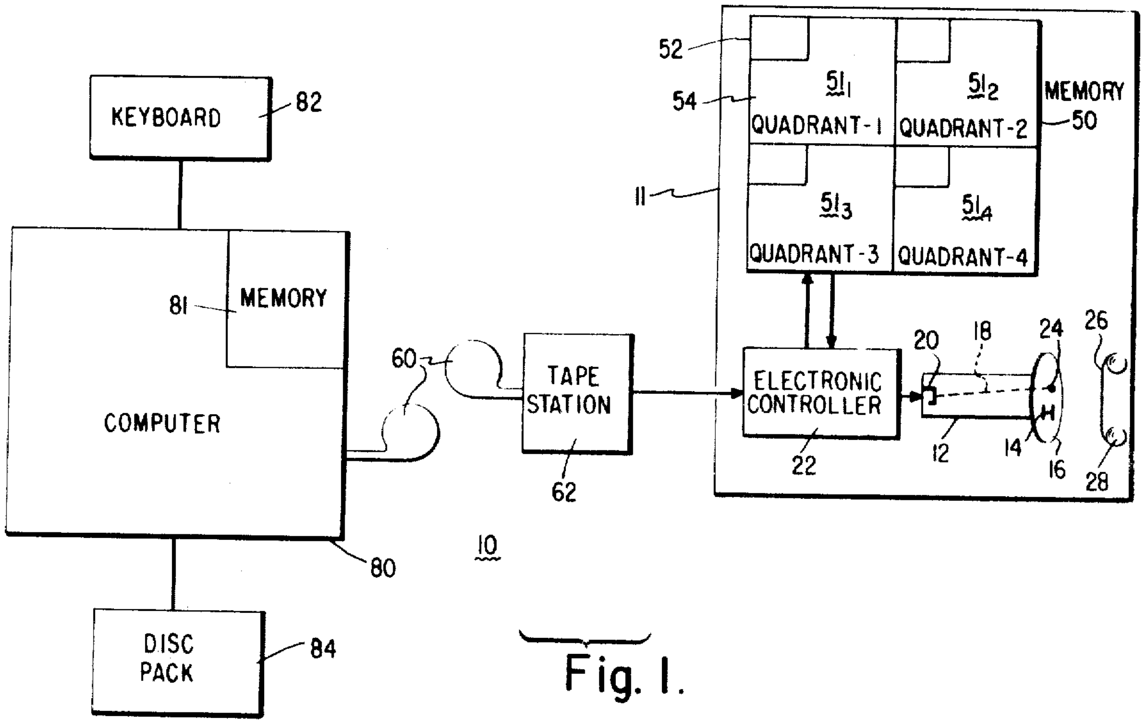
FIG. 1 is a schematic block diagram of an electronic photocomposing system in which the present invention is utilized.

Referring now to FIG. 1 there is shown an electronic photocomposition system 10. A description of the overall system is given first along with a description of how each character is created to provide a background for the subsequent description of the manipulation of the electronic fonts in the system of FIG. 1.

The photocomposition system 10 includes a photocomposing unit 11 that may, for example, comprise an RCA 70/822 Videocomp system or a similar system. The photocomposing unit 11 includes an imaging device 12, such as a cathode ray tube, that creates patterns such as characters 14 on the face 16 of the tube. It is also to be noted that the imaging device 12 may also create patterns other than characters, such as line drawings, halftone images, vectors, etc., and the invention described herein may also be applied to such patterns. The cathode ray tube includes an electronic scanning beam 18 that emanates from the cathode 20 in the electronic gun section (not shown) of the tube 12. The scanning beam 18 is deflected under the control of an electronic controller 22. The scanning beam 18 creates a scanning spot 24 in the phosphor on the face 16 of the tube 12. Patterns in the form of light images are produced by the scanning spot 24 and the patterns created thereby are focused by a lens system (not shown) onto a photosensitive recording surface, such as high gamma photographic film 26. The photographic film 26 is supported in the focal plane of the lens system between a pair of reels 28. The film 26 is driven to a new line of type by a motor (not shown), operated under the control of the electronic controller 22, after each line of characters is imaged onto the film 26.

Figure 2:
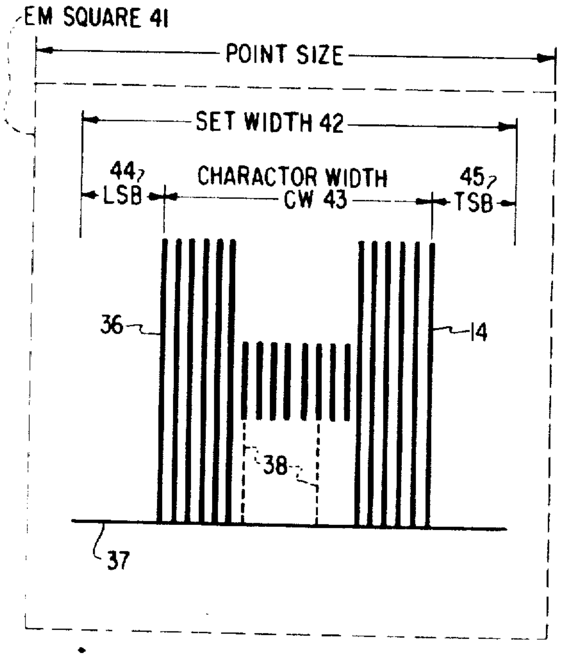
FIG. 2 is a graphic representation of the formation of one character in the system of FIG. 1.

An enlarged view of a character 14 that is formed by the unit 11 is shown in FIG. 2. The character 14 comprises a capital "H" of a given point size from a sans serif font. The capital H, as well as all of the other characters and patterns created by the photocomposing unit 11 are formed by a plurality of black vertical segments 36. The segments 36 are character slices that comprise portions of the scans, or scanlines, when the electron beam 18 in the tube 12 is unblanked. A scan or scanline is one vertical traversal of the face 16 of the tube 12 by the scanning beam 18. Of course, horizontal scanning may also be utilized in practicing the invention. Those portions of the scans wherein the electron beam 18 is blanked are white segments 38 and representative ones are shown dashed in FIG. 2. In the cathode ray tube 12 itself, the black segments 36 are actually white on a dark background whereas the segments 36 are shown dark on a light background in FIG. 2 for illustrative purposes. In characters of a high graphic quality, the black segments 36 overlap each other and are selected to be numerous enough such that a character of a substantially uniform density is formed on the photographic film 26. For convenience, only twenty character slices are shown for the character H in FIG. 2, although in actuality eighty character slices may be utilized. The capital H is seated on a character baseline 37 and ascends above this baseline a predetermined amount as determined by the point size of the character. A point size twice as great as the given point size of the character H comprises a character twice as high and twice as wide as the character H in FIG. 2. The inverse is true for a character one half the point size of the character H, etc.

Each character in a font of characters is defined by a set of parameters that includes an EM square, 41 shown dashed in FIG. 2. The EM square defines the point size of the character. The body size or the overall set width of the character is equal to the sum of the character width 43 (CW) and the leading 44 and trailing 45 side bearings of the character. The leading side bearing 44 (LSB) is defined as the distance from the leading or left outer periphery of the character to the leading end of the set width of the character. Similarly, the trailing side bearing 45 (TSB) is defined as the distance from the right edge of the character to the trailing edge of the set width of the character. One character is spaced from another character by the sum of the trailing and leading side bearings of the respective successive characters. For characters of a high graphic quality, the values of the leading and trailing side bearings for the capital H may comprise seven scans each, with the character width 43 comprising 80 scans.

The parameters of a character, as well as the other portions of an electronic font to be described below, are stored in a utilization storage device or memory 50 in the photocomposing unit 11, of FIG. 1. The memory 50, for example, may be divided into four portions, quadrant 1 through quadrant 4 and labeled $\mathbf{51_1}$ through $\mathbf{51_4}$, respectively. Each division or quadrant of the memory 50 is further divided into a primary portion 52 and a secondary portion 54. The primary portion 52 includes a plurality of successive storage locations that correspond one-to-one with specified characters. Thus, a multi-bit storage location in the primary portion 52 exhibits an address which corresponds to a character code given to one of the characters in a font. Each character is given a different identifying character code and each code corresponds to an address in the primary portion of the memory 50. Characters may be stored in any quadrant of the memory 50. This is accomplished by appending an additional two bit number to the character code to designate which quadrant is being addressed. For example, the binary number 00 may address quadrant $\mathbf{51_1}$, whereas 01, 10, 11 may address the quadrant $\mathbf{51_2}$ through $\mathbf{51_4}$, respectively. Thus, a character of a font is stored in the same relative position of each quadrant in the memory 50 at different times. One character code is sufficient to identify the same character in different fonts and its storage location in the memory 50.

The contents in the primary storage locations 52 of the memory 50 are actually addresses of storage locations in the secondary portions 54 of the memory. Thus, when a character code and a quadrant code addresses the memory 50, the number read from this location in the primary portion of the memory 50 is a secondary address in the secondary portion of the memory 50. This secondary address, as well as a block of immediately successive secondary addresses, contain the coded signals that create the desired character on the imaging device 12. The advantages derived from such an arrangement in the system 10 is that corresponding characters in different fonts have the same character code.

As stated previously, the secondary portion of the memory 50 stores in sequence the blocks of information necessary to create a pattern on the cathode ray tube 12. The contents of the first location of a block of data in the secondary portion 54 may be a coded representation of the number of scans in the leading side bearing (LSB) of the character. The contents of the next two successive locations are coded representations of the number of scans in the character width (CW), and the trailing side bearing (TSB) of the character. For the sake of simplicity, it is assumed that all characters begin at the same baseline.

The next succeeding data stored in the block is not format data but instead is the segment or stroking data which comprise the successive coded representations of the lengths of the individual black segments and the individual white segments in each scan of the character. This is the data that determines how long the electron beam 18 in the imaging device 12 is blanked and unblanked. Thus, each of the lengths of the black segments 36 in the left upright strokes of the character H in FIG. 2 is stored. For example, one word of binary data may be stored for each black segment 36. The lengths of the white segment 38 and the black segment 36 for each scan in the center portion of the character H are then stored. One word of binary data for each white segment and one word for each black segment 36 may be utilized to store these lengths. Finally, the words representing the right upright strokes of the character H are stored, completing the entire character.

To attain synchronism between the scanning beam 18 and reading the memory 50, the stored segment words may also include data relating to the start and retracing of the scanning beam 18, as well as to blanking and unblanking it. For example, it may be desirable to select the least significant bit in a binary word for a black segment 36, i.e., the $2^0$ bit, may be selected to designate the end of a scan. No white segments terminate a scan because the scanning beam 18 is retraced after finishing the last black segment in a scanline. Thus, when a binary word defining a black segment includes a binary "1," in the $2^0$ bit position, it signifies that this black segment is the last black segment in that particular scan. A detector (not shown) in the photocomposing unit 11 detects this bit and retraces the scanning beam immediately after the black segment is created. A binary "0" occurring in the $2^0$ bit position in a binary word defining a black segment indicates that at least one more black segment occurs in the particular scan. Thus, to sum up, the scanning beam is retraced when a binary "1" occurs in the $2^0$ bit position of a binary word defining a black segment.

It may also be desirable to select the next least significant bit in the segment words, i.e., the $2^1$ bit to indicate when the scanning beam should be turned on (i.e., unblanked) and when the beam should be turned off (i.e., blanked). Thus, when a binary "1" is stored in this position, the beam is turned on and when a binary "0" is stored in this position, the beam is turned off. Thus, the black segment words are differentiated from the white segment words by the binary bit stored in this $2^1$ bit position. It is therefore apparent that the segment words themselves may control the scanning out or forming the character slices. A bit detector (not shown) detects this bit in the unit 11.

The instructions for formating a page of type, as well as the textual matter to be printed, are contained on an editorial tape which may, for example, comprise a magnetic tape 60. The electronic fonts, or subsets thereof, to be utilized in composing the textual matter are also contained on the tape 60. A tape station 62 is provided to read the tape 60. The controller 22 is coupled to the tape section 60 to steer the electronic fonts contained on the tape 60 to the memory 50. The character codes for selecting characters to print the text, as well as the instructions for page formatting, are read from the tape 60 routed by the controller 22 to cause the text to be printed correctly on the film 26.

The editorial tape 60 is prepared on a general purpose computer 80. The general purpose computer 80 may, for example, comprise an RCA Spectra 70/45 computer. The computer 80 and the photocomposing unit 11 may operate "on-line," i.e., directly coupled to each other. However, "off-line" operation will be described in the specification. Such operation assumes that the 70/45 computer includes its own tape station and even may be remotely located from the photocomposing unit 11.

The computer 80 accepts instructions and textual matter from a keyboard entry device 82 and selects fonts stored in a disc pack 84, or other master storage device, and prepares the editorial tape 60 for use by the photocomposing unit 11. The computer 80 receives the keyboard 82 entries and hyphenates and justifies the text. The keyboard may, for example, enter data on punched paper tape which is subsequently read in its entirety into the disc pack 84 and then utilized by the computer 80. Such operations permit the computer 80 to operate at top speed while the peripheral devices operate at lower speeds.

The justification is accomplished by reading into a portion of the memory 81 of the computer 80, set width tables that accompanies the electronic fonts as recorded in the disc pack. The individual set widths are counted up for each line of type and the characters are shifted and spaced to get the desired justified line. The computer 80 also hyphenates the textual matter.

The arrangement of the data on the editorial tape 60 may, for example, consist of initializing instructions for resetting the photocomposing unit 11 followed by a font load instruction. A subset of a font follows on the tape 60 to be loaded into the memory 50. At the completion of the font loading operation, the page formatting instructions and the text follow. The text to be set is in the form of the character codes, previously discussed.

FONT MANIPULATION

The system 10 is programmed to manipulate the electronic fonts efficiently. A description of the method that is utilized in the system 10 now follows. Of course, the reason that it is necessary to develop efficient techniques for manipulating electronic fonts is because the memory 50 in the photocopy unit 11 is limited in size. Thus, there are some electronic fonts that cannot be stored therein in their entirety. Furthermore, there are certain other fonts where the large point sized characters require such a large number of character determining signals that it precludes the storage of the entire font in the memory 50. Accordingly, one step in the efficient manipulation of electronic fonts is dividing the fonts into a plurality of subsets of characters. Of course, an electronic font may also be divided into subsets such that each character comprises a different subset. Thus, a subset of an electronic font is effectively defined as including one or more characters. One typical division of an electronic font into subsets is listed in the following tables.

TABLE 1

Subset 0 (basic character complement)

| Subset | Character | Subset | Character |
|---|---|---|---|
| 0 | A | 0 | U. |
| 0 | B | 0 | V. |
| 0 | C | 0 | W. |
| 0 | D | 0 | X. |
| 0 | E | 0 | Y. |
| 0 | F | 0 | Z. |
| 0 | G | 0 | a. |
| 0 | H | 0 | b. |
| 0 | I | 0 | c. |
| 0 | J | 0 | d. |
| 0 | K | 0 | e. |
| 0 | L | 0 | f. |
| 0 | M | 0 | g. |
| 0 | N | 0 | h. |
| 0 | O | 0 | i. |
| 0 | P | 0 | j. |
| 0 | Q | 0 | k. |
| 0 | R | 0 | l. |
| 0 | S | 0 | m. |
| 0 | T | 0 | n. |
| 0 | o | 0 | 8. |
| 0 | p | 0 | 9. |
| 0 | q | 0 | $ (Dollar sign). |
| 0 | r | 0 | & (Ampersand). |
| 0 | s | 0 | . (Period). |
| 0 | t | 0 | , (Comma). |
| 0 | u | 0 | : (Colon). |
| 0 | v | 0 | ; (Semicolon). |
| 0 | w | 0 | - (Hyphen). |
| 0 | x | 0 | ? (Question mark). |
| 0 | y | 0 | ‘ (Open quote-single). |
| 0 | z | 0 | ’ (Close quote-apostrophe). |
| 0 | 0 | 0 | ! (Exclamation point). |
| 0 | 1 | 0 | ( (Open parenthesis). |
| 0 | 2 | 0 | ) (Close parenthesis). |
| 0 | 3 | 0 | * (Asterisk). |
| 0 | 4 | 0 | — (Em dash). |
| 0 | 5 | 0 | – (En dash). |
| 0 | 6 | 0 | / (Shilling). |
| 0 | 7 | 0 | % (Percent). |

SUBSET 1 (LIGATURES AND EM SET FRACTIONS)

| Subset | Character | Subset | Character |
|---|---|---|---|
| 1 | ff | 1 | ¼ |
| 1 | fi | 1 | ⅜ |
| 1 | fl | 1 | ½ |
| 1 | ffi | 1 | ⅝ |
| 1 | ffl | 1 | ¾ |
| 1 | ⅛ | 1 | ⅞ |

SUBSET 2 (SPECIAL CHARACTERS)

| Subset | Character description | Subset | Character description |
|---|---|---|---|
| 2 | \| (Vertical rule) | 2 | ¡ (Spanish exclamation pt.). |
| 2 | [ (Open bracket) | 2 | ¿ (Spanish question mark). |
| 2 | ] (Close bracket) | 2 | Reserved location #1. |
| 2 | — (Align em dash) | 2 | Reserved location #2. |
| 2 | – (Align en dash) | 2 | Reserved location #3. |
| 2 | † (Single dagger) | 2 | Reserved location #4. |
| 2 | ‡ (Double dagger) | 2 | Reserved location #5. |
| 2 | ¶ (Paragraph mark) | 2 | Reserved location #6. |
| 2 | § (Section mark) | 2 | Reserved location #7. |
| 2 | @ (At the rate of) | 2 | Reserved location #8. |
| 2 | # (Number mark) | 2 | Reserved location #9. |

SUBSET 3 (SMALL CAPITALS AND OLD STYLE FIGURES)

| Subset | Character description | Subset | Character description |
|---|---|---|---|
| 3 | A (Small capital) | 3 | T (Small capital). |
| 3 | B (Small capital) | 3 | U (Small capital). |
| 3 | C (Small capital) | 3 | V (Small capital). |
| 3 | D (Small capital) | 3 | W (Small capital). |
| 3 | E (Small capital) | 3 | X (Small capital). |
| 3 | F (Small capital) | 3 | Y (Small capital). |
| 3 | G (Small capital) | 3 | Z (Small capital). |
| 3 | H (Small capital) | 3 | & (Small capital). |
| 3 | I (Small capital) | 3 | 0 (Old style). |
| 3 | J (Small capital) | 3 | 1 (Old style). |
| 3 | K (Small capital) | 3 | 2 (Old style). |
| 3 | L (Small capital) | 3 | 3 (Old style). |
| 3 | M (Small capital) | 3 | 4 (Old style). |
| 3 | N (Small capital) | 3 | 5 (Old style). |
| 3 | O (Small capital) | 3 | 6 (Old style). |
| 3 | P (Small capital) | 3 | 7 (Old style). |
| 3 | Q (Small capital) | 3 | 8 (Old style). |
| 3 | R (Small capital) | 3 | 9 (Old style). |
| 3 | S (Small capital) | 3 | $ (Old style). |

SUBSET 4 (SUPERIOR AND INFERIOR FIGURES)

| Subset | Character | Subset | Character |
|---|---|---|---|
| 4 | $^{0}$ (Superior) | 4 | $_{0}$ (Inferior). |
| 4 | $^{1}$ (Superior) | 4 | $_{1}$ (Inferior). |
| 4 | $^{2}$ (Superior) | 4 | $_{2}$ (Inferior). |
| 4 | $^{3}$ (Superior) | 4 | $_{3}$ (Inferior). |
| 4 | $^{4}$ (Superior) | 4 | $_{4}$ (Inferior). |
| 4 | $^{5}$ (Superior) | 4 | $_{5}$ (Inferior). |
| 4 | $^{6}$ (Superior) | 4 | $_{6}$ (Inferior). |
| 4 | $^{7}$ (Superior) | 4 | $_{7}$ (Inferior). |
| 4 | $^{8}$ (Superior) | 4 | $_{8}$ (Inferior). |
| 4 | $^{9}$ (Superior) | 4 | $_{9}$ (Inferior). |

SUBSET 5 (ACCENTED CHARACTERS)

| Subset | Character | Subset | Character |
|---|---|---|---|
| 5 | Á | 5 | á |
| 5 | À | 5 | à |
| 5 | Â | 5 | â |
| 5 | Ä | 5 | ä |
| 5 | É | 5 | é |
| 5 | È | 5 | è |
| 5 | Ê | 5 | ê |
| 5 | Ë | 5 | ë |
| 5 | Í | 5 | í |
| 5 | Ì | 5 | ì |
| 5 | Î | 5 | î |
| 5 | Ï | 5 | ï |
| 5 | Ó | 5 | ó |
| 5 | Ò | 5 | ò |
| 5 | Ô | 5 | ô |
| 5 | Ö | 5 | ö |
| 5 | Ú | 5 | ú |
| 5 | Ù | 5 | ù |
| 5 | Û | 5 | û |
| 5 | Ü | 5 | ü |
| 5 | Ç | 5 | ç |
| 5 | Ñ | 5 | ñ |

The electronic font is divided into subsets that are related to the frequency with which the characters therein are typeset. Thus, the subset 0 is the basic subset and includes the characters most frequently typeset. Some of the other subsets include characters that are not commonly typeset but when they are, all the characters in the subset could be utilized. A user of the system 10 therefore selects the subsets that he finds most useful when he doesn't select all of them.

A subset is selected according to typesetting usage and may be of a size to fit into one or more quadrants of the memory 50. The subset 0, may for example, require two quadrants. Since, in any normal printing, there are utilized a variety of type fonts and a variety of ranges in the point sizes of the characters typeset, a library of stored electronic fonts is provided on the disc pack 84 or on a similar master storage file.

Figure 3:
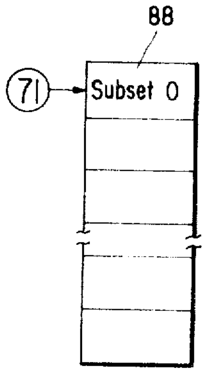
FIGS. 3 and 4 are tabular representations of selected data stored in portions of the memory of the computer contained in the system of FIG. 1.

In preparing the output tape 60, a keyboard operator specifies the font to be utilized in printing the textual matter by depressing particular keys on the keyboard 82. The computer 80 stores the font identification, for example, font #1 is a dynamic table in the memory 81 thereof, such as shown by the table 86 in FIG. *5a*. The first character of the textual matter is routed in the 70/45 computer to a subset translation table 88 shown in FIG. 3. The table 88 is stored in the memory 81 of the computer 80. The keyboard entry may, for example, be made by depressing the key 71 denoting the character "A." The subset translation table 88 therefore denotes that this character belongs in subset 0 and this subset is recorded in the dynamic table 86. The combination of the font identification number and the subset identification then is utilized by the computer 80 to locate the subset 0 of Font 1 on the disc pack 84 and transcribe it in its entirety on the output tape 60. Since this is the first subset required, it is designated to be written in the first available quadrant in the memory 50 of the photocopy unit. The subset 0, however, requires more than one quadrant of the memory 50. This size factor is recorded with the rest of the font in the disc pack 84 and is then read into the dynamic table 86 in FIG. *5a*. A pointer P coupled to the dynamic table 86 then indicates that the next quadrant available to store a subset in the memory 50 is quadrant 3. It is to be noted that when a subset occupies more than one quadrant of the memory 50, the primary portion of the second and succeeding quadrants are utilized to store blocks of character determining signals similar to the secondary portions of these quadrants.

Figure 4:
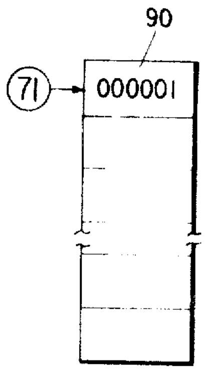

The selected character 71 also is routed to an input address translation table 90 shown in FIG. 4. The table 90 is stored in the memory 81 of the computer 80 and translates the keyboard input into the address or character code of the character A, which is shown as 000001. This may be the first location in the primary portion of each memory. This character code or address is written onto the output tape 60. Successive character codes are then written onto the tape 60 as the text continues.

If a character from subset 2 of a different font, i.e., 2, is then to be typeset such as the number mark #, the subset table 88 addresses the disc pack 84 and the pointer P denotes that this subset 2 is to be written into quadrant 3 of the memory 50. Thus, an important characteristic of the font manipulation technique is that subsets of different fonts may be treated as if all of the subsets came from one very large electronic font. The subset 2 of Font #2 is then written onto the output tape 60 in a manner similar to the way subset 0 of Font #1 was transcribed. The pointer P points to the next available quadrant which is quadrant 4. If a character from the subset 1 of Font #7, i.e., the fraction ¼, is then to be typeset, this subset is read from the disc pack 84 and transcribed onto the tape 60. The pointer N into the dynamic table 86 indicates from which subset the characters presently being typeset are derived. A character which is to be typeset from a previously transcribed or loaded subset may be selected again without retranscribing or loading this subset.

Figures 5, 5A, 5B, 5C, 5D, 5E, 6:
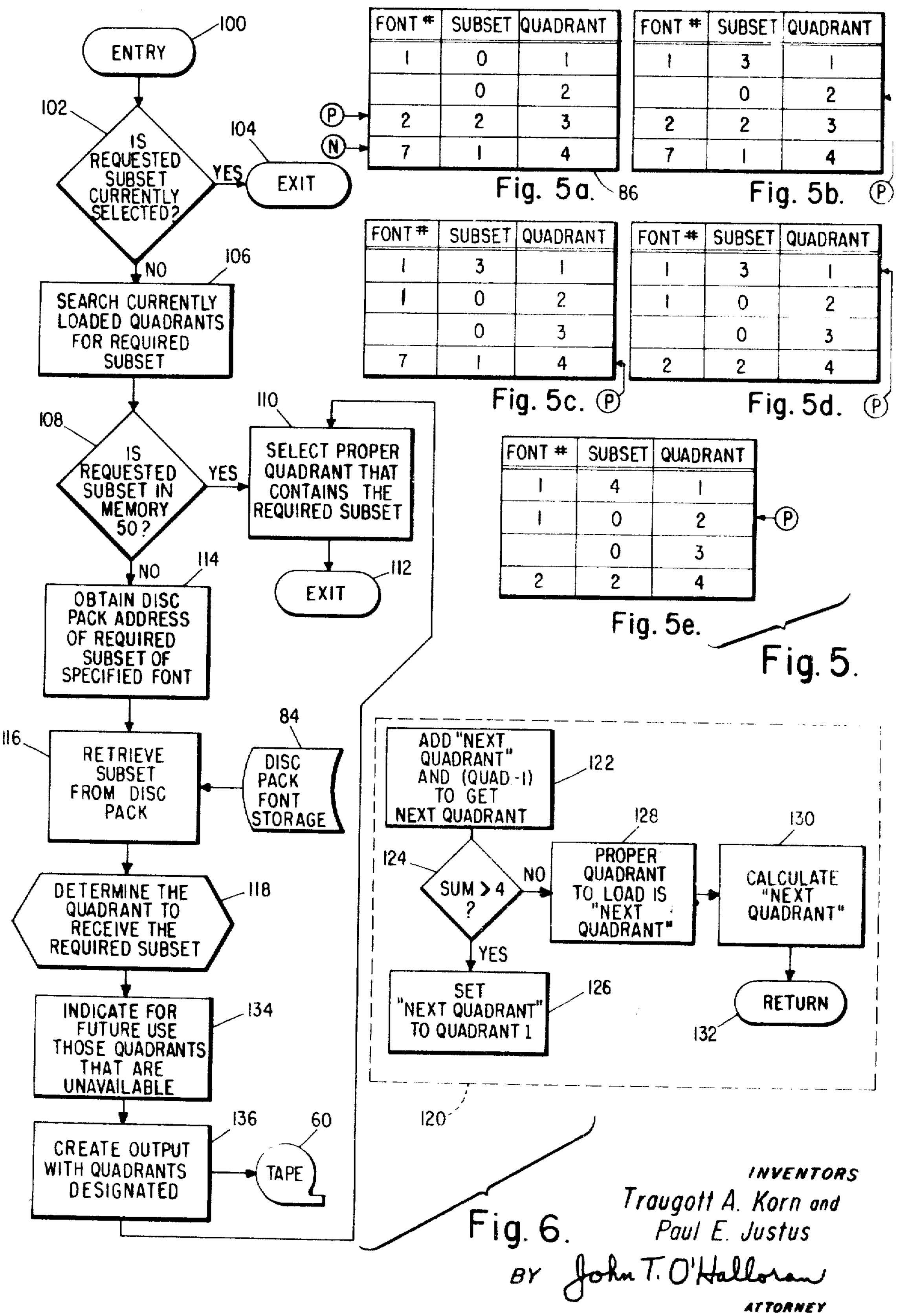
FIG. 5, containing FIGS. *5a, 5b, 5c, 5d,* and *5e* are tabular representations of data that are dynamically created in the computer memory of FIG. 1.
FIG. 6 is a flow chart denoting the programmed steps utilized in manipulating the electronic fonts in the system of FIG. 1.

A flow chart of the subset loading technique or routine is shown in FIG. 6. The entry elipse 100 in FIG. 6 denotes the selection of a character and the ascertainment of the subset to which it belongs. The next step is denoted by the decision box 102, which is to determine if the subset to which the character belongs is the one currently selected in the dynamic table 86, i.e., currently being typeset, as indicated by the pointer N into the dynamic table 86, of FIG. *5a*. If the answer is yes, the routine exits through the elipse 104 and merely prints the character code on the output tape 60. If the answer is no, the process box 106 indicates that the dynamic table 86 is scanned to see if the required subset is already transcribed for loading in the memory 50. If the subset was transcribed on the tape 60 for loading, into the memory 50, the decision box 108 requires that the portion of the memory 50 in which it is to be stored be indicated, as shown by the box 110. The pointer N points to this now active portion of the memory 50 and the quadrant selection instruction is recorded on the tape 60. The character code is transcribed onto the tape 60. The exit elipse 112 then denotes a return to look at the next character to be typeset.

If the subset is not already transcribed on the tape 60 for loading in the memory 50, the address of the subset in the disc pack 84 is then obtained, as shown by the process box 114. The subset is then retrieved from the disc pack 84 and read into the memory as shown by the box 116. The hexagonal box 118, determines the quadrant of the memory 50 where the subset is to be loaded. The box 118 is actually the subroutine 120.

The subroutine 120 includes the step of adding, in an adder 122, the number of the "next quadrant," i.e., next available quadrant, of the memory 50, as specified by the pointer P in FIG. *5a*, to the number of the quadrants needed to store the subset minus one, i.e., (QUAD—1). Thus, if the "next quadrant" is quadrant 4, and the subset extends over two quadrants, the adder 122 adds 4 and (2—1) which is 5. The decision box 124 determines that if the sum is greater than 4, the "next quadrant" is set to be quadrant 1, as shown by the box 126. The reason for this is to prevent a loss of a portion of a subset. If the decision box 124 determines that the sum is less than 4, the quadrant to be loaded is the one already designated "next quadrant" as shown by the process box 128. For example, if the "next quadrant" is quadrant 4, and the subset can be loaded into one quadrant, the adder 122 adds 4 and (1—1) to get 4. Thus, the subset is to be loaded into the "next quadrant" whether this "next quadrant" is a newly calculated one or the quadrant initially pointed to by the pointer P. The process box 130 then calculates the new "next quadrant" by adding the number of quadrants needed to store the subset just transcribed to the old value of "next quadrant." Any sum greater than 4 being an indication to set the "next quadrant" to quadrant 1. The elipse 132 indicates a return to the main routine.

The process box 134 in the main routine denotes that the quadrants to be loaded are recorded in the dynamic table 86. The subset is then read onto an output tape as indicated by the process box 136 with the tape 60 comprising the input tape to the photocopy unit 11. The process box 136 is looped back to the process box 110 to denote that the particular character to be typeset and quadrant where it is contained is then recorded on the output tape 60. The exit elipse 112 denotes a return to look at the next character to be typeset.

The efficiency of the steps in the font manipulation technique may be made more apparent by referring to FIG. 5. The dynamic table 86 in FIG. *5a* illustrates one initial subset loading of the quadrants in the memory 50. If subset 3 of Font #1 is then needed, this subset 3 is overwritten into quadrant 1, effectively destroying the subset 0 therein as shown in FIG. *5b*. Hence, subset 0 is no longer recorded as being present in the memory 50. If subset 0 of Font #1 is then needed again, it is overwritten into quadrants 2 and 3 as shown in FIG. *5c*. If subset 2 of Font #2 is thereafter again needed it is overwritten into quadrant 4, as shown in FIG. *5d*. Similarly, if subset 4 of Font #1 is needed, it is overwritten into quadrant 1 as shown in FIG. *5e*. Thus, in four out of five common situations, the subset 0 is available to be utilized for photocomposing. The subset 0 is the largest subset in the division of the fonts and the one most commonly used. Consequently, the time spent in loading the subsets into the photocomposing unit 11 is kept to a minimum. Furthermore, subsets from different fonts are manipulated as easily as subsets from the same fonts.

It is to be noted that one important advantage of the font manipulation technique described is that a user of the system 10 can ignore the division of characters in a font into subsets. The programmed technique lifts from him the burden of designating to which subset each character belongs, since this is done automatically in the font manipulation scheme. This is an important advantage in eliminating typographical errors and speeding up the keyboard entry of data into the system 10. Also, as illustrated, subsets from different fonts may be stored in different quadrants at the same time, which is an advantage in obtaining increased flexibility in the system.

Thus, in accordance with the invention, a method of manipulating electronic fonts is disclosed. The method permits the effective use of electronic fonts in a memory which exhibits a storage capacity less than that needed for storing all of the character determining signals in the font. The method includes the steps of dividing an electronic font into a plurality of subsets; loading the subsets as needed into successive portions of the memory; automatically monitoring the memory to keep track of the subsets therein; and overwriting additional subsets into successive portions of the memory when needed.

What is claimed is:

1. A method of manipulating electronic fonts each of which include a plurality of character determining signals that create characters to be photocomposed in an electronic photocomposition system, wherein said electronic fonts are divided into a plurality of subsets and each character in a font is represented by a different character code comprising the steps of:

determining from said character codes representing said characters the subsets to which said characters belong;

selecting said determined subsets to be stored successively in locations in a utilization storage device;

monitoring the selected subsets and said locations to keep track of said selected subsets; and overwriting an additional subset onto a previously selected subset to effectively replace said previously selected subset when the storage capacity of the utilization storage device would otherwise be exceeded by storing the additional subset therein.

2. The method in accordance with claim 1 that further includes the step of initially storing said electronic fonts and the subsets thereof in a master storage file in selected locations.

3. The method in accordance with claim 2 that further includes the step of providing an indication of the locations wherein said font and said subsets are stored in said master storage file.

4. The method in accordance with claim 1 that further includes the step of providing a tabular indication of the subset to which each character in an electronic font has been assigned.

5. The method in accordance with claim 1 wherein said additional subset is selected from a different electronic font than said previously selected subset.

6. The method in accordance with claim 4 wherein the monitoring step of claim 1 includes the substeps of preparing a dynamic tabulation of said selected subsets to be stored in said utilization storage device and the locations in said storage device wherein said selected subsets are to be stored, and ascertaining from said dynamic tabulation the locations in said storage device of the subsets to which said characters belong.

7. A method of manipulating electronic fonts of characters in an electronic photocomposition system wherein said electronic fonts are divided into a plurality of subsets, said system including a photocomposing unit having a memory, comprising the steps of:

determining to which subset characters to be photocomposed belong;

selecting said determined subsets to be stored in different locations in said memory, monitoring the locations the determined subsets are to be stored in said memory, and selecting an additional subset to be overwritten on a previously selected subset to effectively replace said previously selected subset when the storage capacity of the memory would otherwise be exceeded by storing the additional subset therein.

References Cited

UNITED STATES PATENTS

| | | | |
|---|---|---|---|
| 2,714,843 | 8/1955 | Hooven | 95—4.5 |
| 3,305,841 | 2/1967 | Schwartz. | |
| 3,325,786 | 6/1967 | Shashoua et al. | 340—172.5 |
| 3,396,377 | 8/1968 | Strout | 340—172.5X |
| 3,422,401 | 1/1969 | Lucking | 340—172.5 |

PAUL J. HENON, Primary Examiner

H. E. SPRINGBORN, Assistant Examiner

U.S. Cl. X.R.

340—324